US012518416B1

(12) United States Patent
Wee et al.

(10) Patent No.: US 12,518,416 B1
(45) Date of Patent: Jan. 6, 2026

(54) SYSTEMS AND METHODS FOR LIDAR-BASED SENSOR FUSION FOR A TRACKING SYSTEM OF A TARGET DEVICE AT A TARGET FREQUENCY

(71) Applicant: Kudan Inc., Tokyo (JP)

(72) Inventors: Juan Wee, Menlo Park, CA (US); Fnu Atul Hari, Mountain View, CA (US)

(73) Assignee: Kudan Inc., Shinjuku-Ku (JP)

( * ) Notice: Subject to any disclaimer, the term of this patent is extended or adjusted under 35 U.S.C. 154(b) by 0 days.

(21) Appl. No.: 19/043,239

(22) Filed: Jan. 31, 2025

(51) Int. Cl.
| | |
|---|---|
| *G06T 7/00* | (2017.01) |
| *G01C 21/00* | (2006.01) |
| *G01C 21/16* | (2006.01) |
| *G01S 17/00* | (2020.01) |
| *G01S 17/89* | (2020.01) |
| *G06T 7/70* | (2017.01) |

(52) U.S. Cl.
CPC ............ *G06T 7/70* (2017.01); *G01C 21/1652* (2020.08); *G01S 17/89* (2013.01); *G06T 2207/10028* (2013.01)

(58) Field of Classification Search
CPC ............ G06T 7/70; G06T 2207/10028; G01C 21/1652; G01S 17/89
USPC ....................................................... 701/500
See application file for complete search history.

(56) References Cited

U.S. PATENT DOCUMENTS

| | | | | |
|---|---|---|---|---|
| 2021/0064043 | A1* | 3/2021 | Kulkarni | ................ G05D 1/028 |
| 2021/0173094 | A1* | 6/2021 | Chen | .................... G01S 19/485 |

OTHER PUBLICATIONS

Sarvesh Pimpalkar, "Enhancing Robotic Localization with IMUs: A Fundamental Technology for Precise Navigation," Aug. 2024, ADI Analog Dialogue, vol. 58, No. 3, whole document. (Year: 2024).*
Shihong Huang, Dalin Ma Jiayang Wu, Caihou Lin, "Application of Semantic Information Module in LiDAR-Based Simultaneous-Localization-and-Mapping Algorithm," Jan. 20, 2025, whole document. (Year: 2025).*
Sasha Przbylski, "The math behind Extended Kalman Filtering," Jan. 9, 2024. (Year: 2024).*
Stephen C. Stubberud, "Online Sensor Modeling Using a Neural Kalman Filter," Aug. 2007, IEEE Transactions on Instrumentality and Measurement, vol. 56, No. 4. (Year: 2007).*
Mengtian Li, "Resource-Constrained Learning and Inference for Visual Perception," May 10, 2022, whole document. (Year: 2022).*
"(Mindmap) A Hardcore Look at 9 types of LiDAR systems," Jun. 29, 2023, Think Autonomous, Blog, whole document. (Year: 2023).*

(Continued)

*Primary Examiner* — Tiffany P Young
(74) *Attorney, Agent, or Firm* — Scale LLP

(57) ABSTRACT

The present disclosure provides a system for tracking a target device in three-dimensional space. The system includes a light detection and ranging (LiDAR) sensor physically attached to a target device and configured to generate LiDAR data of an environment at a first frequency, and an inertial measurement unit (IMU) configured to generate IMU data at a second frequency higher than the first frequency. At least one processor is configured to perform simultaneous localization and mapping (SLAM) using the LiDAR data to generate SLAM pose data at at least the first frequency, perform sensor fusion of the SLAM pose data and the IMU data to generate fused pose data at a third frequency higher than the first frequency and lower than the second frequency, and output the fused pose data to provide position and orientation of the target device.

20 Claims, 12 Drawing Sheets

(56) References Cited

OTHER PUBLICATIONS

Xuemin Hu, "Learning a Deep Cascaded Neural Network for Multiple Motion Commands Prediction in Autonomous Driving," Dec. 2021, IEEE Transactions on Intelligent Transportation Systems, vol. 22, No. 12, whole document. (Year: 2021).*

Kai Dai, "LiDAR-Based Sensor Fusion SLAM and Localization for Autonomous Driving Vehicles in Complex Scenarios," Feb. 20, 2023, National Library of Medicine, whole document. (Year: 2023).*

"Inertial Measurement Unit (IMU)—An Introduction," Feb. 13, 2023, Advanced Navigation. (Year: 2023).*

\* cited by examiner

SYSTEMS AND METHODS FOR LIDAR-BASED SENSOR FUSION FOR A TRACKING SYSTEM OF A TARGET DEVICE AT A TARGET FREQUENCY

TECHNICAL FIELD

The present disclosure relates to augmented reality systems, and more particularly to a high-frequency camera tracking system using lidar and inertial measurement unit sensors for precise localization in dynamic environments.

BACKGROUND

Augmented reality (AR) systems have gained significant attention in recent years, offering the ability to overlay digital content onto the real world. These systems find applications in various fields, including entertainment, education, and industrial settings. A critical component of AR systems is the ability to accurately track the position and orientation of cameras or other viewing devices in three-dimensional space.

Traditional camera tracking methods often rely on visual features or markers in the environment. However, these approaches can struggle in dynamic or featureless environments, or when rapid camera movements occur. Additionally, many existing solutions suffer from drift over time, leading to misalignment between virtual content and the real world.

To address these challenges, some systems have incorporated additional sensors such as inertial measurement units (IMUs) or global positioning system (GPS) receivers. While these can improve tracking performance, they often introduce their own limitations. IMUs are prone to accumulating errors over time, while GPS signals may be unavailable or unreliable in indoor or urban environments.

The present disclosure is directed to overcoming one or more of these above-referenced challenges.

SUMMARY OF THE DISCLOSURE

According to certain aspects of the disclosure, systems, methods, and computer readable memory are disclosed for LiDAR-based sensor fusion for a tracking system of a target device at a target frequency.

In some cases, a system for tracking a target device in three-dimensional space may include: a light detection and ranging (LiDAR) sensor physically attached to a target device and configured to generate LiDAR data of an environment at a first frequency; an inertial measurement unit (IMU) configured to generate IMU data at a second frequency higher than the first frequency; and at least one processor configured to perform operations. The operations may include: perform simultaneous localization and mapping (SLAM) using the LiDAR data to generate SLAM pose data at at least the first frequency; perform sensor fusion of the SLAM pose data and the IMU data to generate fused pose data at a third frequency, wherein the third frequency is higher than the first frequency and lower than the second frequency; and output the fused pose data to provide position and orientation of the target device.

In some cases, a method for tracking a target device in three-dimensional space, may include: generating light detection and ranging (LiDAR) data of an environment at a first frequency using a LIDAR sensor physically attached to a target device; generating inertial measurement unit (IMU) data at a second frequency higher than the first frequency using an IMU; performing simultaneous localization and mapping (SLAM) using the LiDAR data to generate SLAM pose data at at least the first frequency; performing sensor fusion of the SLAM pose data and the IMU data to generate fused pose data at a third frequency, wherein the third frequency is higher than the first frequency and lower than the second frequency; and outputting the fused pose data to provide position and orientation of the target device.

In some cases, a non-transitory computer-readable medium storing instructions that, when executed by at least one processor, cause the at least one processor to perform operations for tracking a target device in three-dimensional space. The operations may include: receiving light detection and ranging (LiDAR) data of an environment at a first frequency from a LIDAR sensor physically attached to a target device; receiving inertial measurement unit (IMU) data at a second frequency higher than the first frequency from an IMU; performing simultaneous localization and mapping (SLAM) using the LiDAR data to generate SLAM pose data at at least the first frequency; performing sensor fusion of the SLAM pose data and the IMU data to generate fused pose data at a third frequency, wherein the third frequency is higher than the first frequency and lower than the second frequency; and outputting the fused pose data to provide position and orientation of the target device.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Figure 1:
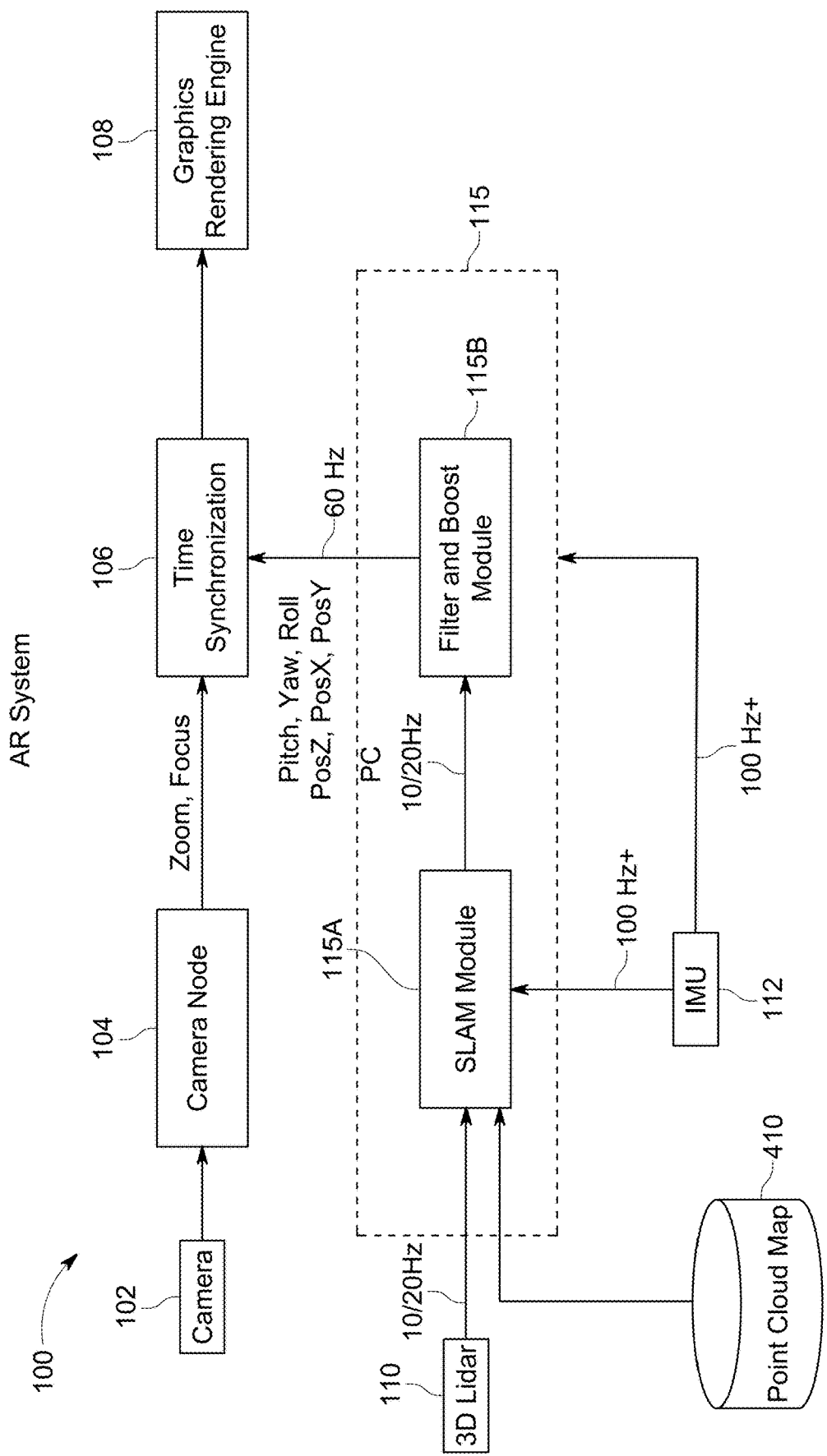
FIG. 1 illustrates a block diagram of an augmented reality system, according to aspects of the present disclosure.

LiDAR (Light Detection and Ranging) technology has emerged as a promising tool for three-dimensional mapping and localization. LiDAR sensors can provide highly accurate depth measurements of the surrounding environment, potentially offering more robust tracking capabilities compared to purely visual methods. However, integrating LIDAR data with camera tracking systems presents its own set of challenges, including differences in data rates, field of view, and the need for precise temporal and spatial alignment between sensors.

Furthermore, many AR applications, particularly in broadcast or live event settings, require extremely low latency and high update rates to maintain a seamless user experience. This demands efficient processing of sensor data and the ability to generate accurate pose estimates at frame rates matching or exceeding those of modern video cameras.

As AR technology continues to advance, there is an ongoing need for improved tracking systems that can provide highly accurate, low-latency pose estimation in a wide range of environments and use cases. Such systems must be capable of fusing data from multiple sensor modalities, handling dynamic scenes, and maintaining consistent performance over extended periods of operation.

The present disclosure relates to systems and methods for high-precision camera tracking in augmented reality applications. Augmented reality systems often require accurate and smooth tracking of camera movements to properly overlay digital content onto real-world scenes. However, existing solutions face challenges in maintaining precise tracking, especially in environments where traditional positioning technologies like GPS are unavailable or unreliable.

The systems and methods described herein address these challenges by utilizing a combination of sensors and advanced processing techniques. In particular, the disclosed approaches enable high-frequency pose estimation for target devices (e.g., cameras). This may be useful in, e.g., GPS-denied environments, such as indoor stadiums or arenas. This allows for seamless augmented reality experiences even in enclosed spaces where satellite-based positioning is not feasible.

Furthermore, the present systems are designed to handle dynamic environments with moving objects and varying environment conditions. In settings like sporting events, where players, officials, and spectators are in constant motion, maintaining accurate camera tracking can be difficult. The disclosed techniques account for these dynamic elements, allowing for robust pose estimation even as the scene changes rapidly.

By addressing these key challenges, the systems and methods described herein enable more immersive and stable augmented reality applications in a wide range of environments. The following sections will describe the components and operation of these systems in greater detail.

Thus, methods and systems of the present disclosure may be improvements to computer technology, AR technology, and/or tracking systems.

1. Tracking System for Augmented Reality System

FIG. 1 illustrates a block diagram of an augmented reality system 100. The augmented reality system 100 may include a camera 102 (or other target device) that connects to a camera node 104. The camera node 104 may process camera data, including zoom and focus information.

The augmented reality system 100 may include a processing system 115 that contains two main processing modules-a SLAM module 115A and a filter and boost module 115B. The SLAM module 115A may receive input from a lidar sensor 110 and an IMU sensor 112. In some cases, the lidar sensor 110 may operate at 10/20 Hz (e.g., a first frequency) and the IMU sensor 112 may operate at 100 Hz or higher (e.g., a second frequency). The SLAM module 115A may process this sensor data in conjunction with a point cloud map 410 to generate SLAM pose information. The SLAM pose information may include position and orientation data at the first frequency.

The filter and boost module 115B may receive the 10/20 Hz output (e.g., SLAM pose information) from the SLAM module 115A along with the 100 Hz+ IMU sensor 112 data. The filter and boost module 115B may process and combine these inputs to generate consistent pose data at an increased output frequency (e.g., at a frequency that is higher than the SLAM data and lower than the IMU data). The pose data may include position and orientation data at a third frequency—that is a target frequency of the camera (e.g., 60 Hz) or target device.

The augmented reality system 100 may include a synchronization module 106 that coordinates timing between various system components. The synchronization module 106 may receive position and orientation data from the filter and boost module 115B at, e.g., 60 Hz, and the camera data from the camera node 104. This synchronized data may then be provided to a graphics engine 108 which renders the augmented reality output.

In some cases, the processing system 115 may be implemented on a PC platform and may handle the sensor fusion, filtering, and frequency conversion needed to provide smooth tracking data to the graphics engine 108. The system architecture may enable coordination between the lower frequency lidar data and higher frequency IMU data to generate stable position tracking at the video frame rate.

Figure 2:
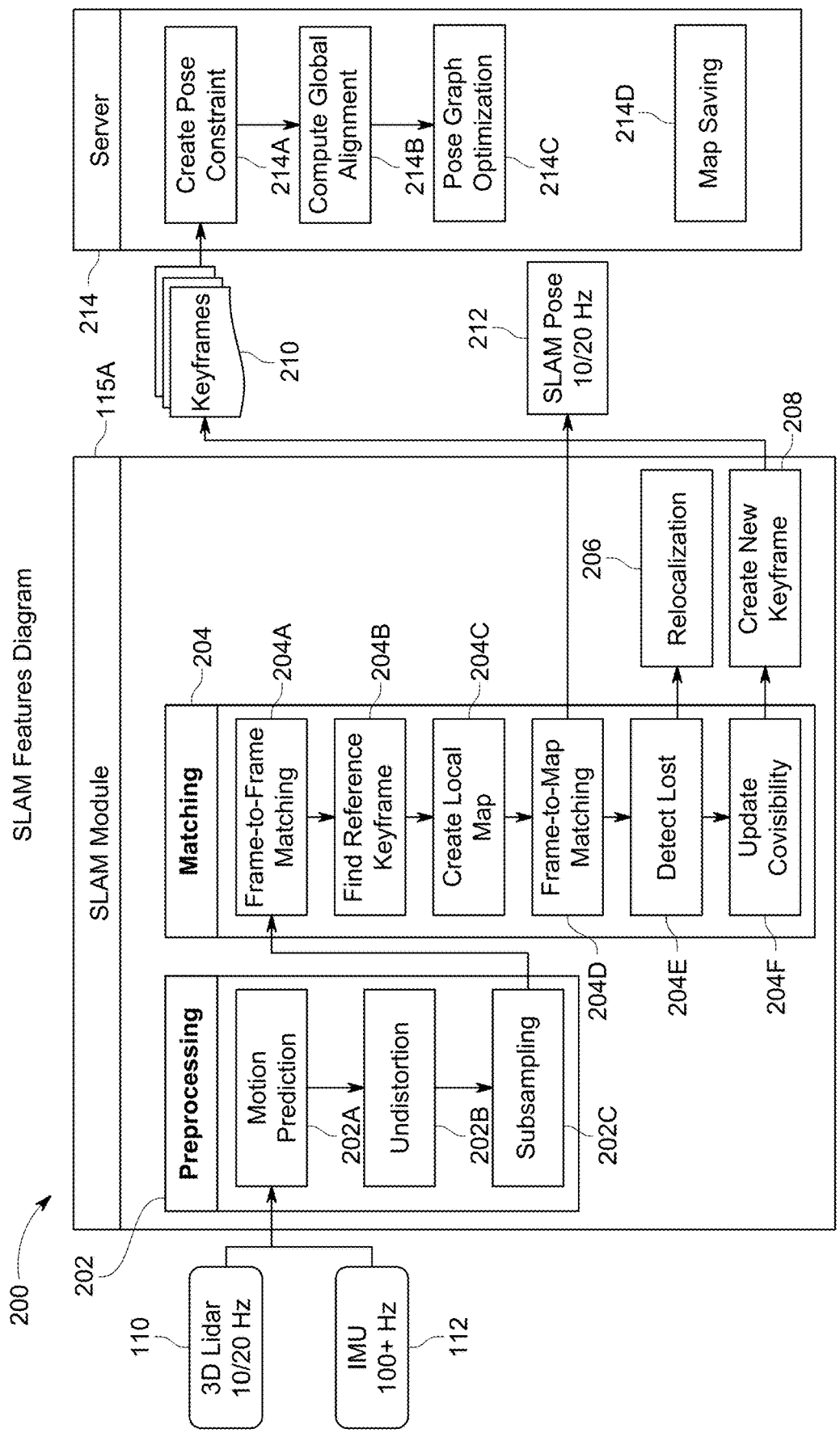
FIG. 2 illustrates a block diagram of a SLAM system, according to aspects of the present disclosure.

FIG. 2 illustrates a block diagram of a slam system 200 that processes data from a lidar sensor 110 and an imu sensor 112 to generate pose information. The slam system 200 includes several interconnected modules that work together to estimate the position and orientation of a camera or other device in three-dimensional space.

A preprocessing module 202 receives input from both the lidar sensor 110 and the imu sensor 112. The preprocessing module 202 contains a motion predictor 202A, an undistortion module 202B, and a subsampling module 202C. In some cases, the motion predictor 202A may use data from the imu sensor 112 to estimate motion between lidar frames. The undistortion module 202B may correct for distortions in the lidar data caused by sensor motion during scanning. This undistortion process may utilize the imu sensor 112 data to compensate for movement artifacts. The subsampling module 202C may reduce the density of the point cloud data to improve processing efficiency.

A matching module 204 performs several operations to align the current sensor data with existing map information. The matching module 204 includes a frame matcher 204A that conducts frame-to-frame matching between consecutive lidar scans. A keyframe finder 204B identifies reference frames that may be used for localization. A map creator 204C generates a local map of the environment, which is then used by a map matcher 204D for frame-to-map matching. A loss detector 204E monitors the tracking status to detect when the system may have lost its position estimate. A covisibility updater 204F maintains information about which landmarks or features are visible from different viewpoints.

When tracking is lost, a relocalization module 206 works to recover the position estimate. A keyframe generator 208 (e.g., based on outputs of the covisibility updater 204F) creates new keyframes that are stored in a keyframe storage 210. The slam system 200 generates a slam pose 212 as output, typically at the same frequency as the lidar sensor 110 input.

A server 214 contains several components for processing the pose information and maintaining the map. A pose generator 214A creates pose constraints based on sensor measurements and map information. An alignment calculator 214B refines these pose estimates. A graph optimizer 214C processes the pose constraints to generate a globally consistent trajectory and map. A map storage 214D maintains the environmental map data, which may be represented as a point cloud.

In some cases, the slam system 200 may operate in a mapped mode using a pre-generated point cloud map of the environment. This pre-generated map may be created during an initial mapping phase and stored in the map storage 214D. When operating in mapped mode, the slam system 200 may primarily focus on localizing the current pose within the existing map.

Alternatively, the slam system 200 may operate in real-time without a pre-generated map. In this mode, the system may simultaneously build a map of the environment while estimating its pose. This real-time mapping and localization may be particularly useful in dynamic or previously unmapped environments.

The slam system 200 processes the sensor data through these various modules to generate accurate pose estimates while maintaining a point cloud map representation of the environment. The use of both lidar and imu sensor data allows the system to handle a wide range of environments and motion scenarios, including situations where traditional positioning technologies may be unavailable or unreliable.

Figure 3:
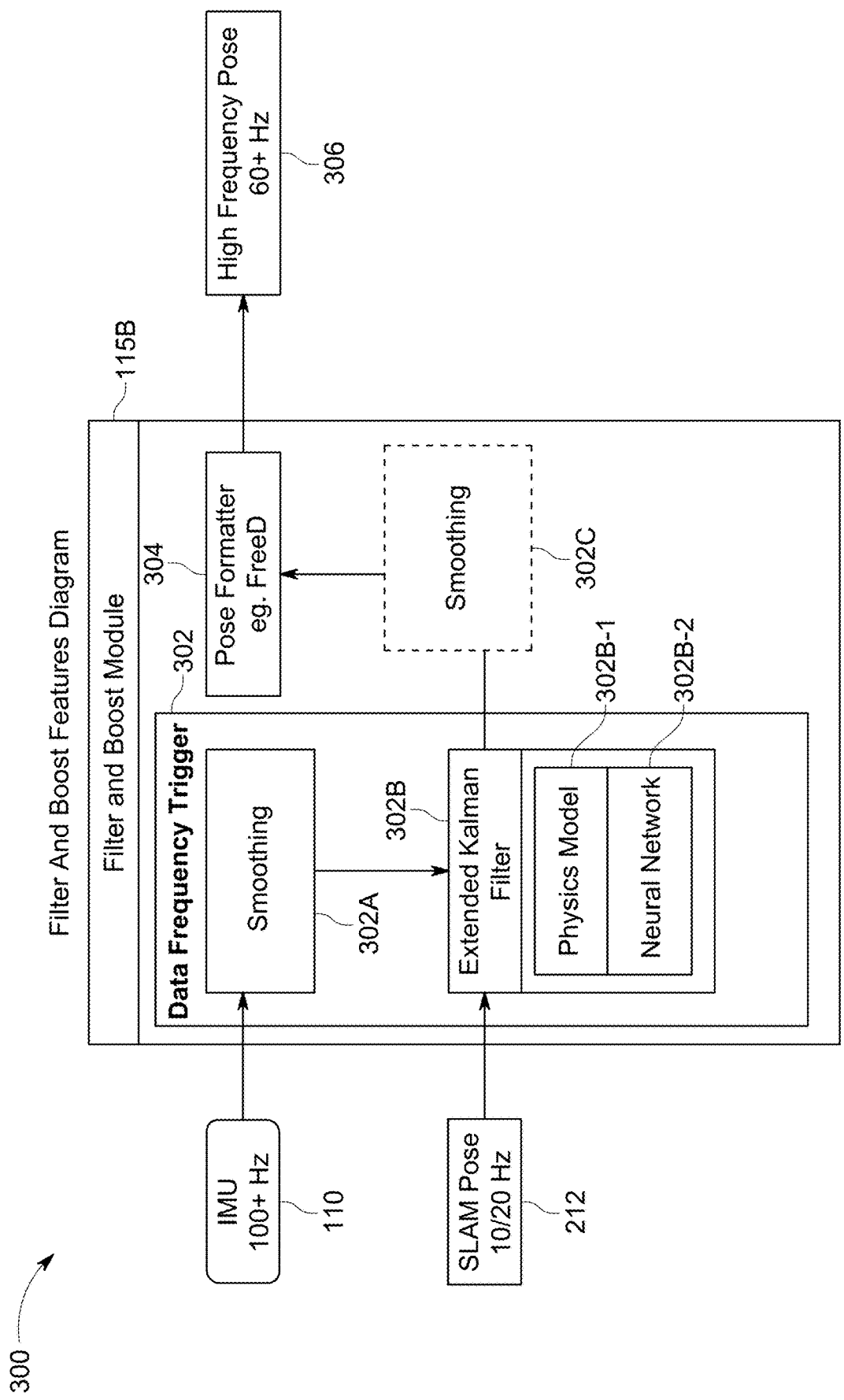
FIG. 3 illustrates a filter and boost features diagram, according to aspects of the present disclosure.

FIG. 3 illustrates a filter boost system 300 showing components of the filter and boost module 115B. The filter and boost module 115B may receive input from two sources: the IMU sensor 112 operating at the second frequency (e.g., 100+ Hz) and a SLAM pose 212 operating at the first frequency (e.g., 10 Hz, 20 Hz, or higher).

The filter boost system 300 may include a frequency trigger 302 that contains a smoothing filter 302A for noise filtering and smoothing (e.g., ESKF subsampling and noise filtering). The filter boost system 300 may also incorporate an extended Kalman filter 302B, which may contain two subcomponents: a physics model 302B-1 and/or a neural network 302B-2.

The (optional) smoothing filter 302A may process the input from the IMU sensor 112 and feed the filtered data to the extended Kalman filter 302B. The SLAM pose 212 data may also be input directly into the extended Kalman filter 302B. The extended Kalman filter 302B may process these inputs using one of or both of: a physics model 302B-1 and/or a neural network 302B-2.

In some cases, the extended Kalman filter 302B may use at least a 6-state vector (and, e.g., up to a 21-state vector) to represent the system state. This extended state representation may allow for more accurate modeling of complex motion and improved pose estimation.

The processed data from the extended Kalman filter 302B may flow into a pose formatter 304, after (optionally) being processed by a smoothing module 302C. The smoothing module 302C may further refine the output of the extended Kalman filter 302B to ensure consistent and jitter-free motion estimates. This additional smoothing step may help to eliminate any remaining high-frequency noise or artifacts that could negatively impact the visual quality of the augmented reality experience. The pose formatter 304 may format the data into a specific format (e.g., FreeD). The pose formatter 304 may then output the data as a high frequency pose output 306 operating at 60+ Hz.

The filter boost system 300 may transform the lower frequency SLAM pose data and higher frequency IMU sensor data into a smoothed, high-frequency pose output suitable for real-time applications. The filter and boost module 115B may process and combine these inputs to generate consistent pose data at an increased output frequency, which may be used by other components of the augmented reality system 100, such as the synchronization module 106 and the graphics engine 108.

Figure 4:
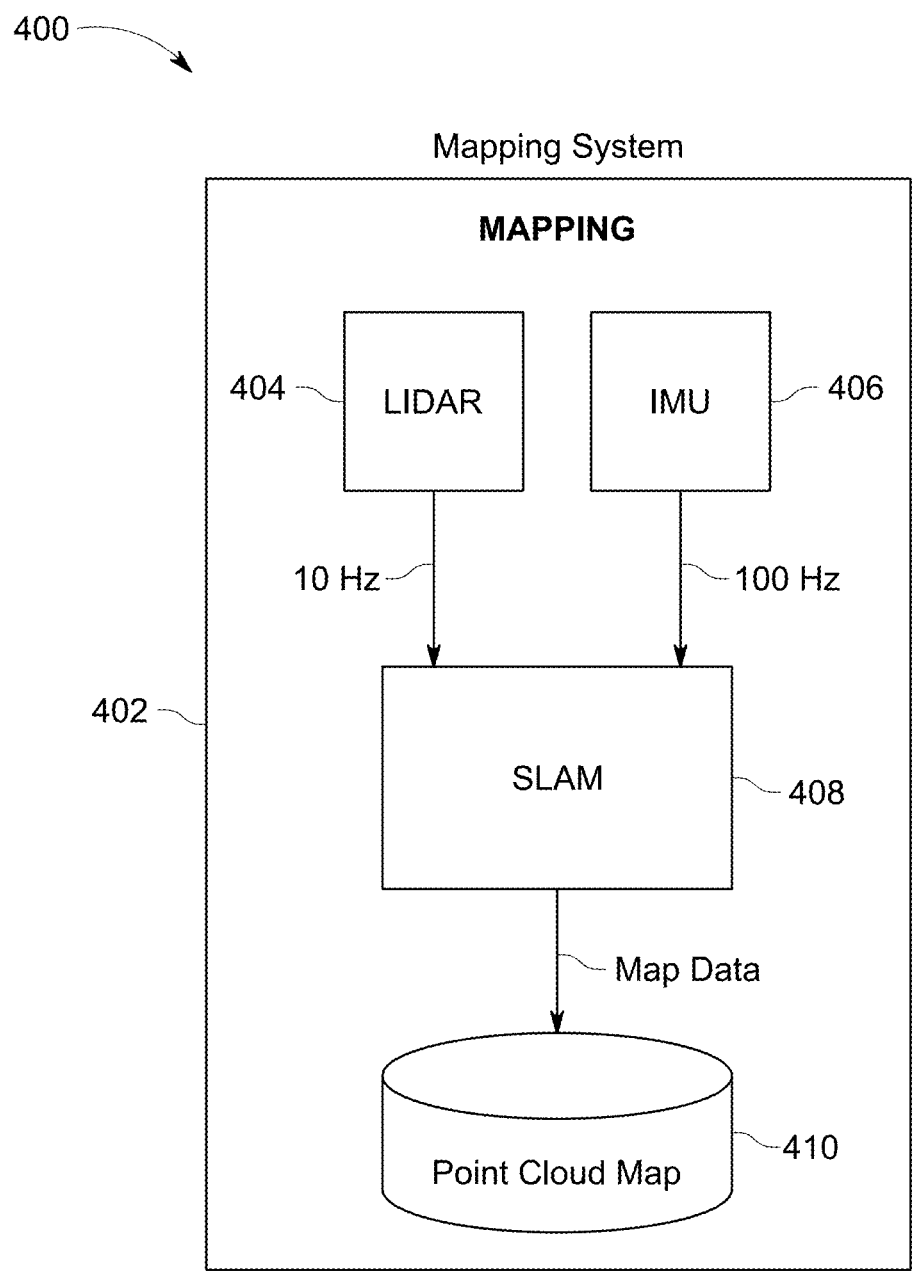
FIG. 4 illustrates a block diagram of a mapping system for generating a point cloud map, according to aspects of the present disclosure.

FIG. 4 illustrates a block diagram of a mapping system 400 for generating a point cloud map. The mapping system 400 may be the same as, or be used by, the system 100, or a separate system. The mapping system 400 may include a mapping module 402 that contains several components working together to create a three-dimensional representation of an environment.

The mapping module 402 may receive input from two sensors: a lidar sensor 404 and an imu sensor 406. In some cases, the lidar sensor 404 may operate at 10 Hz and the imu sensor 406 may operate at 100 Hz. The lidar sensor 404 may provide spatial data while the imu sensor 406 may provide motion and orientation data.

These sensor inputs may be processed by a slam processor 408, which may perform simultaneous localization and mapping operations. The slam processor 408 may combine and process the data from both sensors to generate map data. In some cases, the slam processor 408 may use the imu sensor 406 data to compensate for distortions in the lidar sensor 404 data caused by motion during scanning.

The output from the slam processor 408 may be used to create and update the point cloud map 410. The point cloud map 410 may store the three-dimensional spatial data representing the mapped environment, which can be used for subsequent localization and tracking operations.

In some cases, the mapping system 400 may operate in two modes: a mapping mode and a localization mode. During the mapping mode, the system may focus on building a comprehensive point cloud map 410 of the environment. This may involve scanning the entire area and processing the sensor data to create a detailed 3D representation.

Once the initial mapping is complete, the mapping system 400 may switch to localization mode. In this mode, the system may primarily use the existing point cloud map 410 for real-time tracking and pose estimation. The slam processor 408 may compare incoming sensor data against the stored map to determine the current position and orientation of the sensors within the mapped environment.

The mapping system 400 may also support map updates during operation. As the sensors move through the environment, the slam processor 408 may identify changes or new features not present in the original map. These updates may be integrated into the point cloud map 410 to maintain an accurate representation of the environment over time.

In some cases, the mapping system 400 may work in conjunction with other components of the augmented reality system 100. For example, the point cloud map 410 generated by the mapping system 400 may be used by the slam module 115A to provide accurate pose estimates for augmented reality applications.

Figure 5:
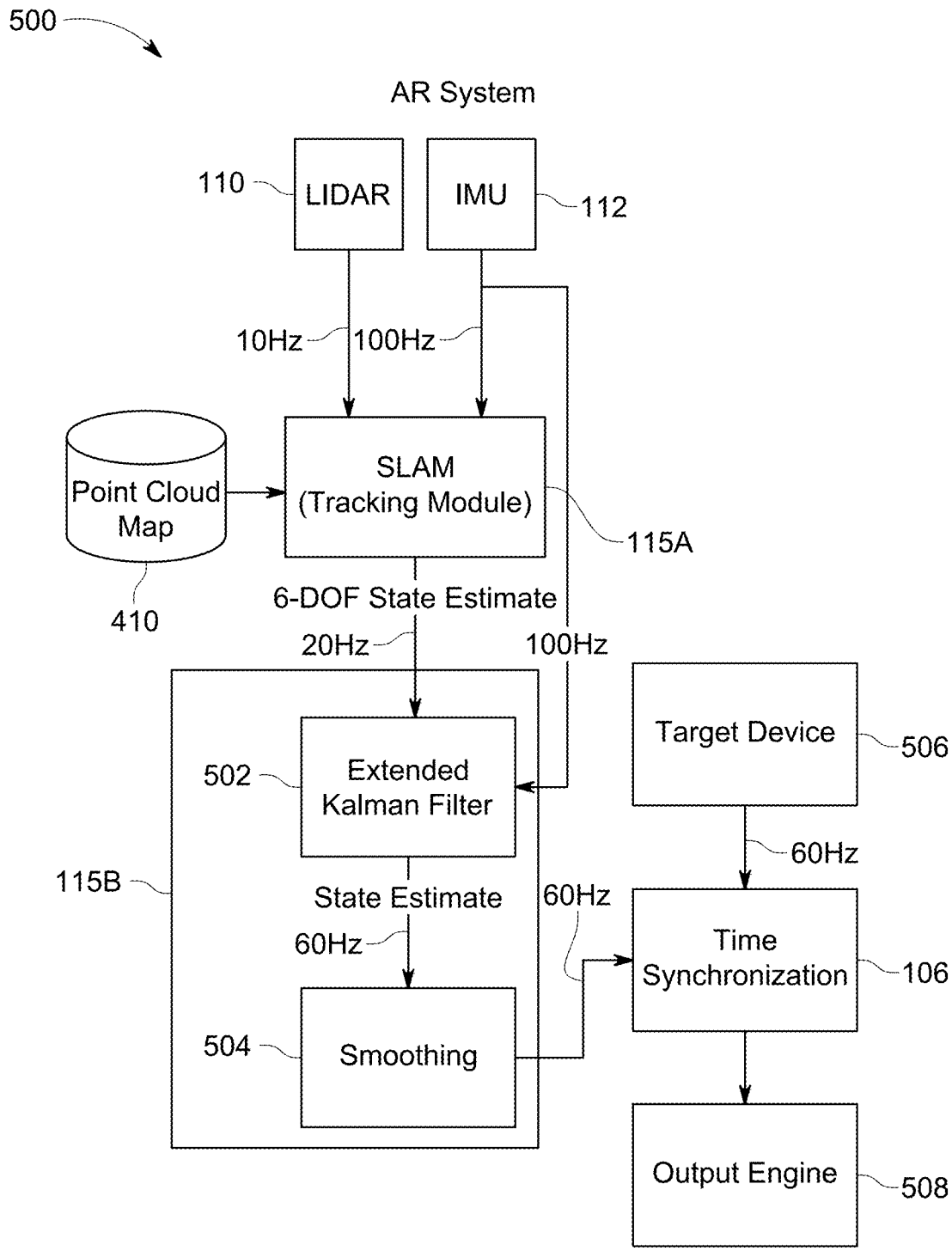
FIG. 5 illustrates a block diagram of an augmented reality system, according to aspects of the present disclosure.

FIG. 5 illustrates a block diagram of an augmented reality system 500. The augmented reality system 500 may include a LIDAR sensor 110 operating at a first frequency (e.g., 10 Hz) and an IMU sensor 112 operating at a second frequency (e.g., 100 Hz). The LIDAR sensor 110 may work in conjunction with a point cloud map 410 to provide input to a SLAM module 115A.

The SLAM module 115A may process inputs from both the LIDAR sensor 110 and IMU sensor 112 to generate a 6-DOF state estimate at 20 Hz. This state estimate may be fed into a filter and boost module 115B, which may contain an extended Kalman filter 502 and a smoothing module 504. The extended Kalman filter 502 may process the 20 Hz state estimate along with the 100 Hz IMU data to generate a state estimate at a third frequency (e.g., a target frequency, such as 60 Hz). The smoothing module 504 may further refine this estimate to produce smooth 60 Hz output.

The tracking system 500 may include a target device 506 (e.g., a camera 102) operating at the target frequency (e.g., 60 Hz or 120 Hz). The output from the filter and boost module 115B may be synchronized with the feed from the target device through a synchronization module 106. The synchronized data may then be passed to an output engine 508 (e.g., a graphics engine 108) for further processing and/or distribution.

Figure 6:
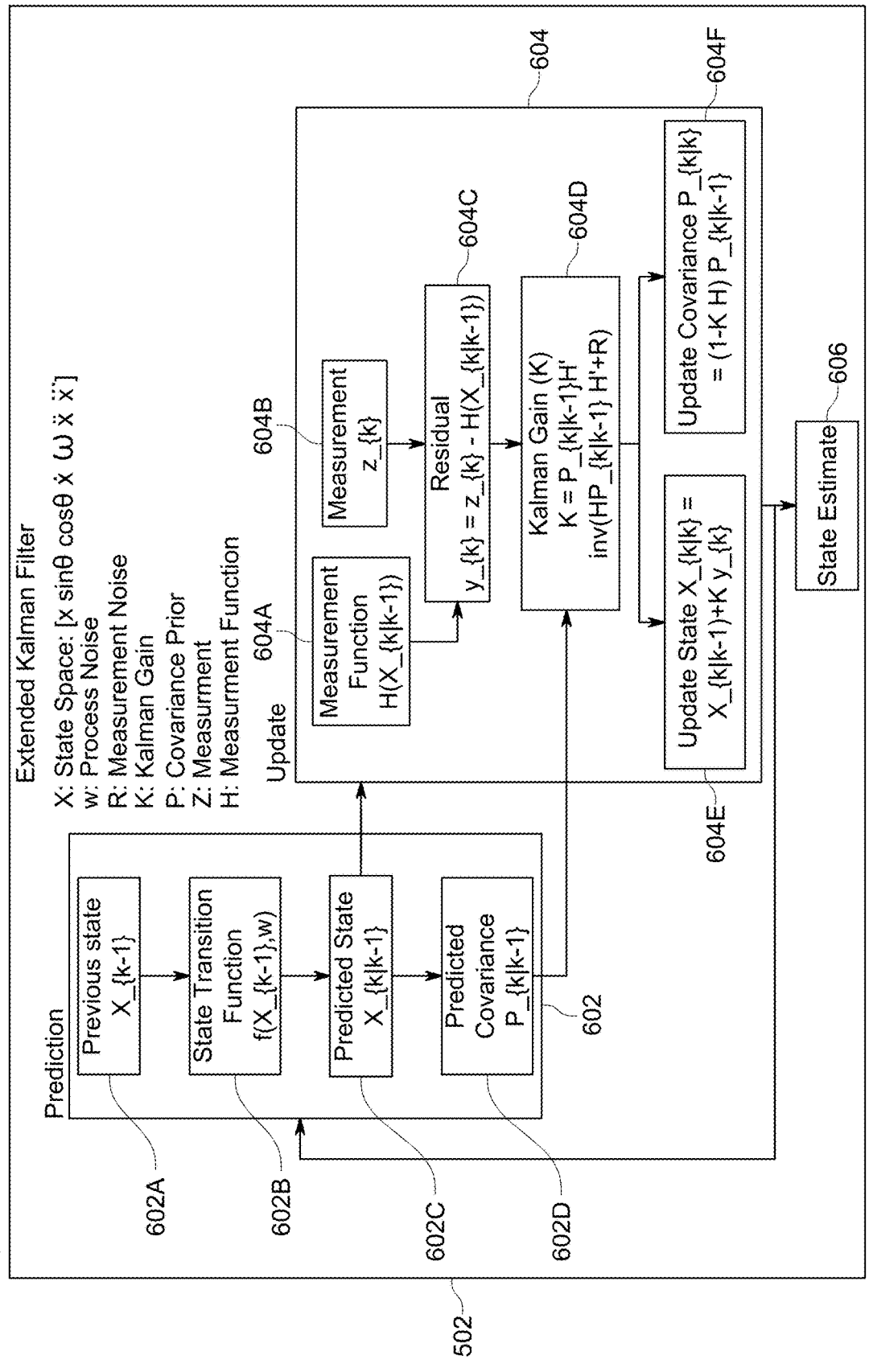
FIG. 6 illustrates a Kalman filter diagram showing components of an extended Kalman filter, according to aspects of the present disclosure.

FIG. 6 illustrates a Kalman filter diagram 600 showing the components and operation of the extended Kalman filter 502. The extended Kalman filter 502 may include a prediction module 602 and an update module 604 that work together to generate a state estimate 606.

The prediction module 602 may receive a state input 602A containing the previous state information. This input may pass through a state transition block 602B which may apply a transition function to the previous state. The output may feed into both a state predictor 602C that generates a predicted state, and a covariance predictor 602D that calculates the predicted covariance.

The update module 604 may contain several interconnected components. A measurement function 604A may process the predicted state, while a measurement input 604B may provide current measurement data. These inputs may feed into a residual calculator 604C that determines the difference between predicted and measured values. A gain calculator 604D may compute the Kalman gain using the residual and covariance information.

The extended Kalman filter 502 may include a state updater 604E that combines the predicted state with the Kalman gain-weighted residual to generate an updated state estimate. In parallel, a covariance updater 604F may update the covariance matrix. The outputs from both updaters may feed into the state estimator 606, which may produce the final state estimate for the current time step.

The extended Kalman filter 502 may operate in a recursive manner, with the state estimate feeding back into the prediction module 602 for the next iteration. This recursive process may allow the filter to continuously refine its estimates based on new measurements and predictions.

In some cases, the extended Kalman filter 502 may use a 21-state vector to represent the system state. This extended state representation may allow for more accurate modeling of complex motion and improved pose estimation. The state vector may include position, orientation, velocity, and higher-order motion derivatives to capture the full dynamics of the camera movement.

The extended Kalman filter 502 may be designed to achieve millimeter-level smoothness between frames. This high level of precision may be crucial for maintaining stable and accurate augmented reality overlays, especially in dynamic environments such as sports stadiums. The filter may accomplish this by carefully balancing the trade-off between responsiveness to new measurements and smoothness of the estimated trajectory.

The smoothing module 504 may further refine the output of the extended Kalman filter 502 to ensure consistent and jitter-free motion estimates. This additional smoothing step may help to eliminate any remaining high-frequency noise or artifacts that could negatively impact the visual quality of the augmented reality experience.

By combining the high-frequency IMU data with the lower-frequency but more accurate SLAM pose estimates, the extended Kalman filter 502 may generate smooth, high-frequency pose estimates that closely track the true camera motion. This fusion of sensor data may enable the augmented reality system 500 to maintain precise tracking even in challenging environments where traditional positioning technologies may be unreliable or unavailable.

Figure 7:
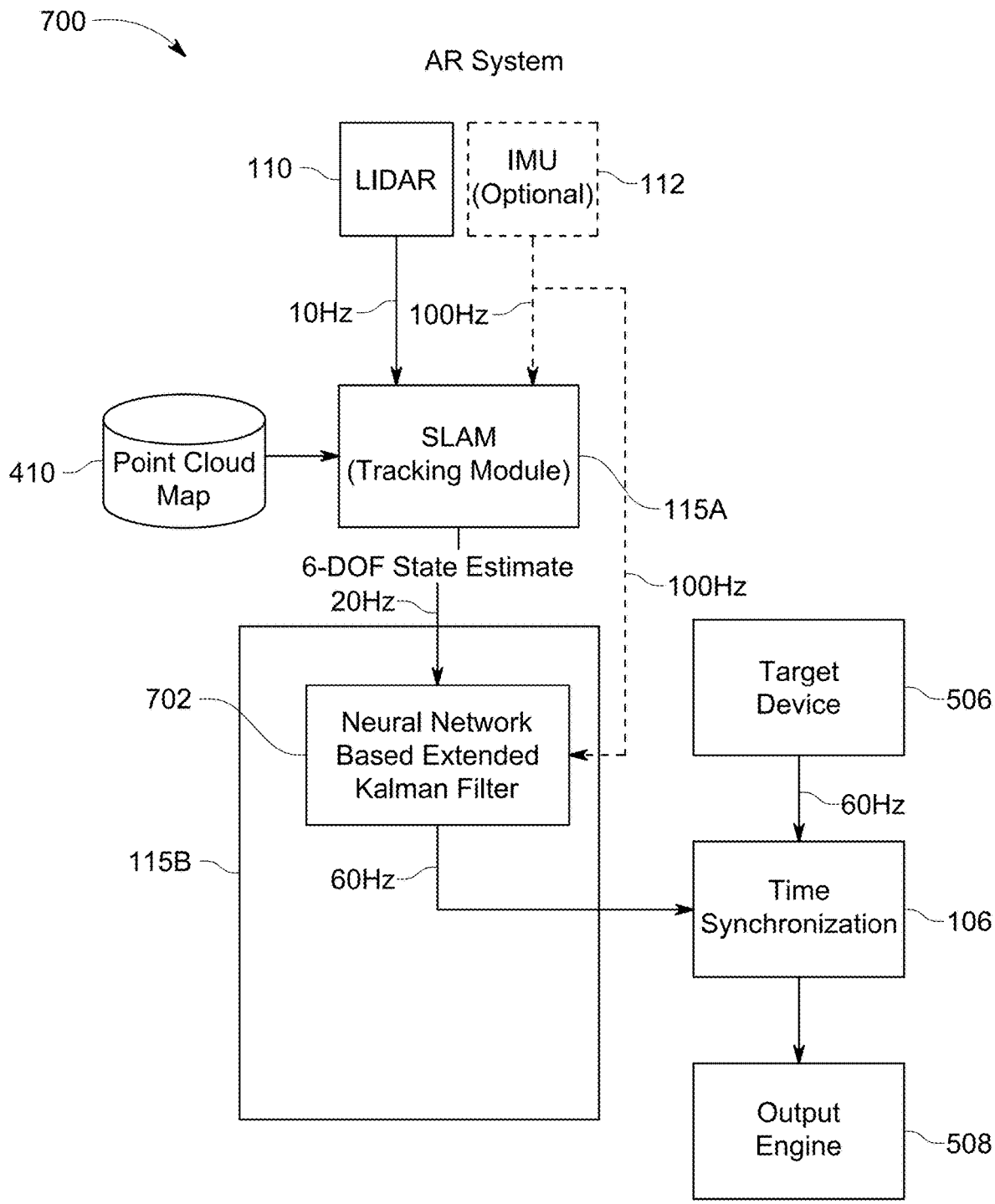
FIG. 7 illustrates a block diagram of an augmented reality system with a neural network Kalman filter, according to aspects of the present disclosure.

FIG. 7 illustrates a block diagram of a tracking system 700. The tracking system 700 may include a lidar sensor 110 operating at a first frequency (e.g., 10 Hz) and an optional imu sensor 112 operating at a second frequency (e.g., 100 Hz or 200 Hz). The lidar sensor 110 may work in conjunction with a point cloud map 410 to provide input to a slam module 115A.

The slam module 115A may process the sensor data to generate a 6-DOF state estimate at 20 Hz. This output may feed into a filter and boost module 115B, which may contain a neural network Kalman filter 702. The neural network Kalman filter 702 may learn inherent physical model from the data unlike the previous system 500, where a prior knowledge of the physical model may be required to make predictions. The filter and boost module 115B may process the state estimate along with optional IMU data to generate a smooth pose at a third frequency (e.g., a target frequency, such as 60 Hz) as an output signal.

The tracking system 700 may include a target device 506 (e.g., a camera 102) operating at the target frequency (e.g., 60 Hz or 120 Hz). The output from the filter and boost module 115B may be synchronized with the feed from the target device through a synchronization module 106. The synchronized data may then be passed to an output engine 508 (e.g., a graphics engine 108) for further processing and/or distribution.

Figure 8:
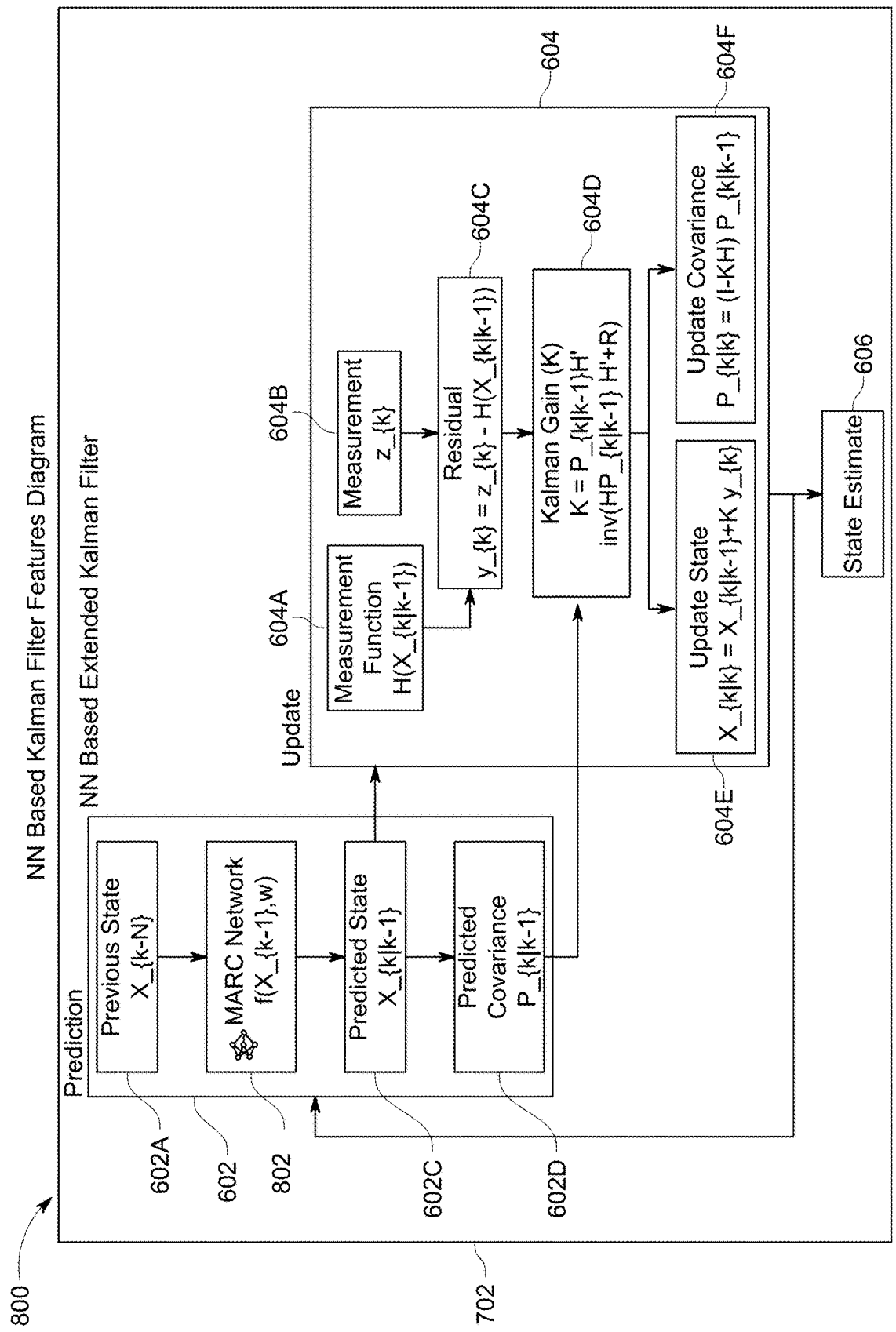
FIG. 8 illustrates a neural network Kalman filter diagram, according to aspects of the present disclosure.

FIG. 8 illustrates a neural network Kalman filter diagram 800 showing the architecture of the neural network Kalman filter 702. The neural network Kalman filter 702 may comprise a prediction module 602 and an update module 604 that work together to generate state estimates.

The prediction module 602 may receive the state input 602A and process it through a neural network system 802. The output from the neural network system 802 may feed into the state predictor 602C, which may generate the predicted state. In parallel, a covariance predictor 602D may generate the predicted covariance information.

The update module 604 may contain several interconnected components. The measurement function 604A may process the predicted state, while the measurement input 604B may provide current measurement data. The processed information may flow to the residual calculator 604C which may compute the difference (as residual information) between the measurement and predicted values. The gain calculator 604D may determine the Kalman gain using the predicted covariance and residual information.

The neural network Kalman filter 702 may include the state updater 604E and the covariance updater 604F that may use the calculated Kalman gain to refine the state and covariance estimates respectively. The final output may flow to a state estimator 606, which may produce the filtered state estimate.

In some cases, the filter and boost module 115B may include a neural network-based prediction model called MARC (Multi-Axis Recurrent Cascaded Network). The MARC model may be implemented within the neural network system 802 of the neural network Kalman filter 702. This neural network-based approach may allow for more accurate prediction of complex motion patterns and may help in generating smoother, high-frequency pose estimates.

The neural network Kalman filter 702 may process the lower-frequency SLAM pose data from the slam module 115A along with the higher-frequency IMU data from the imu sensor 112. By combining these inputs using the neural network-based prediction model, the filter and boost module 115B may generate consistent and accurate pose estimates at target frequency (e.g., 60 Hz or 120 Hz) required for smooth augmented reality rendering.

The components of the neural network Kalman filter 702 may be arranged in a feedback configuration, with the state estimate being fed back to the prediction module 602 for the next iteration of the filtering process. This recursive structure may allow the system to continuously refine its predictions based on new sensor data and previous state estimates.

Figure 9:
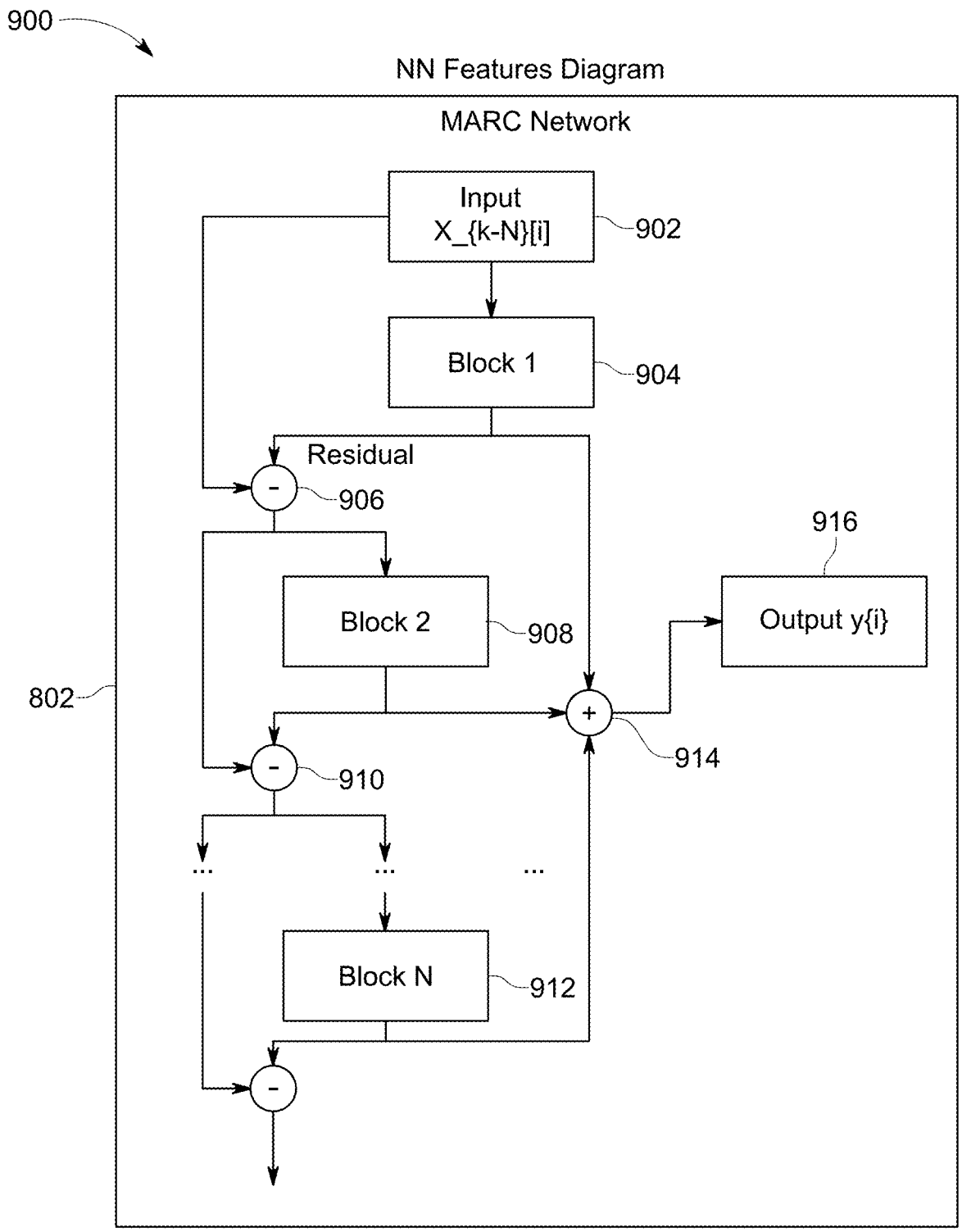
FIG. 9 illustrates a neural network features diagram showing the architecture of a neural network system, according to aspects of the present disclosure.

FIG. 9 illustrates a neural network features diagram 900 showing the architecture of the neural network system 802. The neural network system 802 may process input data 902 through multiple processing blocks arranged in a cascaded configuration.

The neural network system 802 may receive the input data 902 which may be processed through a first processing block 904. The output of the first processing block 904 may generate a residual signal 906 that feeds into subsequent processing stages. A second processing block 908 may process this residual signal 906.

The neural network system 802 may implement cascade connections 910 between processing blocks, allowing information to flow both horizontally and vertically through the network. This cascaded structure may continue through additional processing blocks, culminating in an nth processing block 912.

The outputs from the various processing blocks may be combined to produce a sum signal 914. The sum signal 914 may represent the aggregated processing results from all blocks in the cascade. The neural network system 802 may generate output data 916 based on this sum signal 914.

Figure 10:
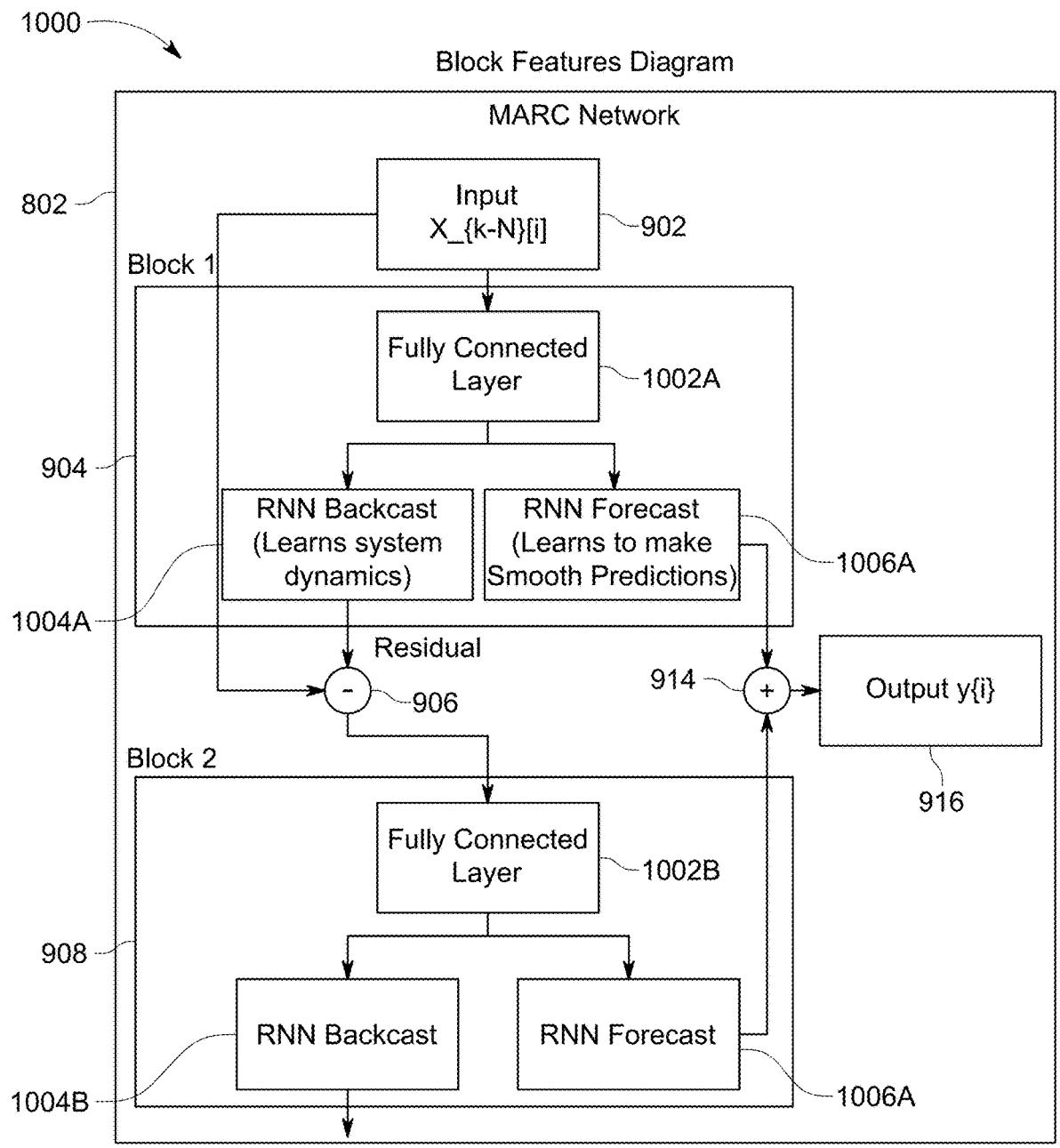
FIG. 10 illustrates a block features diagram of a neural network system, according to aspects of the present disclosure.

FIG. 10 illustrates a block diagram 1000 of the neural network system 802. The neural network system 802 may receive the input data 902 which may be processed through multiple processing blocks. The first processing block 904 may contain a first connected layer 1002A that splits the processing into two parallel paths: a first backcast network 1004A that learns system dynamics, and a first forecast network 1006A that generates smooth predictions.

The output from the first backcast network 1004A may be used to generate the residual signal 906. This residual signal 906 may feed into the second processing block 908, which may contain a second connected layer 1002B. Similar to the first processing block 904, the second connected layer 1002B may split into a second backcast network 1004B and a second forecast network 1006B.

The neural network system 802 may combine the outputs from both forecast networks through the sum signal 914. The sum signal 914 may represent the combined predictions from both processing blocks, which may produce the final output data 916.

In some cases, the architecture of the neural network system 802 may allow for sequential processing of the input data 902 through multiple stages while maintaining parallel paths for learning dynamics and generating predictions. This structure may enable the neural network system 802 to capture complex motion patterns and generate smooth, high-frequency pose estimates for use in the augmented reality system 100.

The cascaded structure with backcast and forecast networks may allow the neural network system 802 to effectively process the lower-frequency SLAM pose data and higher-frequency IMU sensor data. The backcast networks may focus on learning the underlying dynamics of the camera motion, while the forecast networks may generate smooth predictions that maintain consistency between frames.

The augmented reality system integrates multiple sensors and processing modules to achieve high-frequency camera tracking for seamless augmented reality experiences. The system combines data from a LIDAR sensor and an inertial measurement unit (IMU) to generate accurate and smooth pose estimates at a higher frequency than the primary LIDAR sensor can provide alone.

In operation, the LIDAR sensor captures 3D point cloud data of the surrounding environment at a relatively low frequency, typically 10-20 Hz. This data is processed by a simultaneous localization and mapping (SLAM) module to generate initial pose estimates and maintain a map of the environment. The SLAM module may operate in either a pre-mapped mode, where it localizes within an existing point cloud map, or in real-time mapping mode for unknown environments.

Concurrently, the IMU sensor captures high-frequency motion data, often at 100 Hz or higher. This data includes acceleration and angular velocity measurements, which provide information about the camera's movement between LIDAR frames. The system fuses the lower-frequency LIDAR-based pose estimates with the higher-frequency IMU data to generate smooth and accurate pose estimates at 60 Hz or higher, matching the frame rate of the camera and display system.

The fusion of sensor data may be accomplished through various filtering techniques. In some cases, an extended Kalman filter may be employed to combine the SLAM pose estimates with IMU measurements. The filter may use a physics-based motion model to predict the camera's movement between LIDAR updates, with IMU data providing corrections to these predictions. In other cases, a neural network-based Kalman filter may be used, leveraging machine learning techniques to more accurately model complex motion patterns and environmental dynamics.

To achieve the required smoothness for augmented reality applications, the system may employ additional smoothing techniques. These may include windowed averaging, adaptive filtering, or more sophisticated algorithms designed to minimize jitter while maintaining responsiveness to actual camera movements. The smoothing process must balance the need for accurate tracking with the requirement for visually stable augmented reality overlays.

The high-frequency pose estimates generated by the filtering and smoothing processes are then synchronized with the camera's video feed. This synchronization ensures that the augmented reality content is rendered and composited with the correct timing relative to the real-world imagery captured by the camera. The synchronized pose and video data are then passed to a graphics engine, which uses this information to render virtual content in the correct position and orientation relative to the real world.

In some cases, the system may incorporate additional sensors or data sources to further improve tracking accuracy. For example, in environments with known fixed reference points, the system may use visual markers or other localization aids to periodically correct any accumulated drift in the pose estimates.

The integrated system is designed to handle challenging environments where traditional positioning technologies like GPS may be unavailable or unreliable. This includes indoor spaces, stadiums, and other areas with potential electromagnetic interference or limited satellite visibility. By fusing data from multiple sensor types and employing advanced filtering techniques, the system can maintain accurate and smooth camera tracking even in dynamic environments with moving objects and changing lighting conditions.

The high-frequency tracking capabilities of the system enable a wide range of augmented reality applications. These may include live sports broadcasts with virtual overlays, immersive entertainment experiences, industrial visualization tools, and more. The system's ability to provide stable and accurate pose estimates at video frame rates allows for seamless integration of virtual content with real-world imagery, creating compelling and responsive augmented reality experiences.

2. Flowchart

The present disclosure relates to systems and methods for high-precision camera tracking in augmented reality applications. Augmented reality systems often require accurate and smooth tracking of camera movements to properly overlay digital content onto real-world scenes. However, existing solutions face challenges in maintaining precise tracking, especially in environments where traditional positioning technologies like GPS are unavailable or unreliable.

The systems and methods described herein address these challenges by utilizing a combination of sensors and advanced processing techniques. In particular, the disclosed approaches enable high-frequency pose estimation for target devices (e.g., cameras). This may be useful in, e.g., GPS-denied environments, such as indoor stadiums or arenas. This allows for seamless augmented reality experiences even in enclosed spaces where satellite-based positioning is not feasible.

Figure 11:
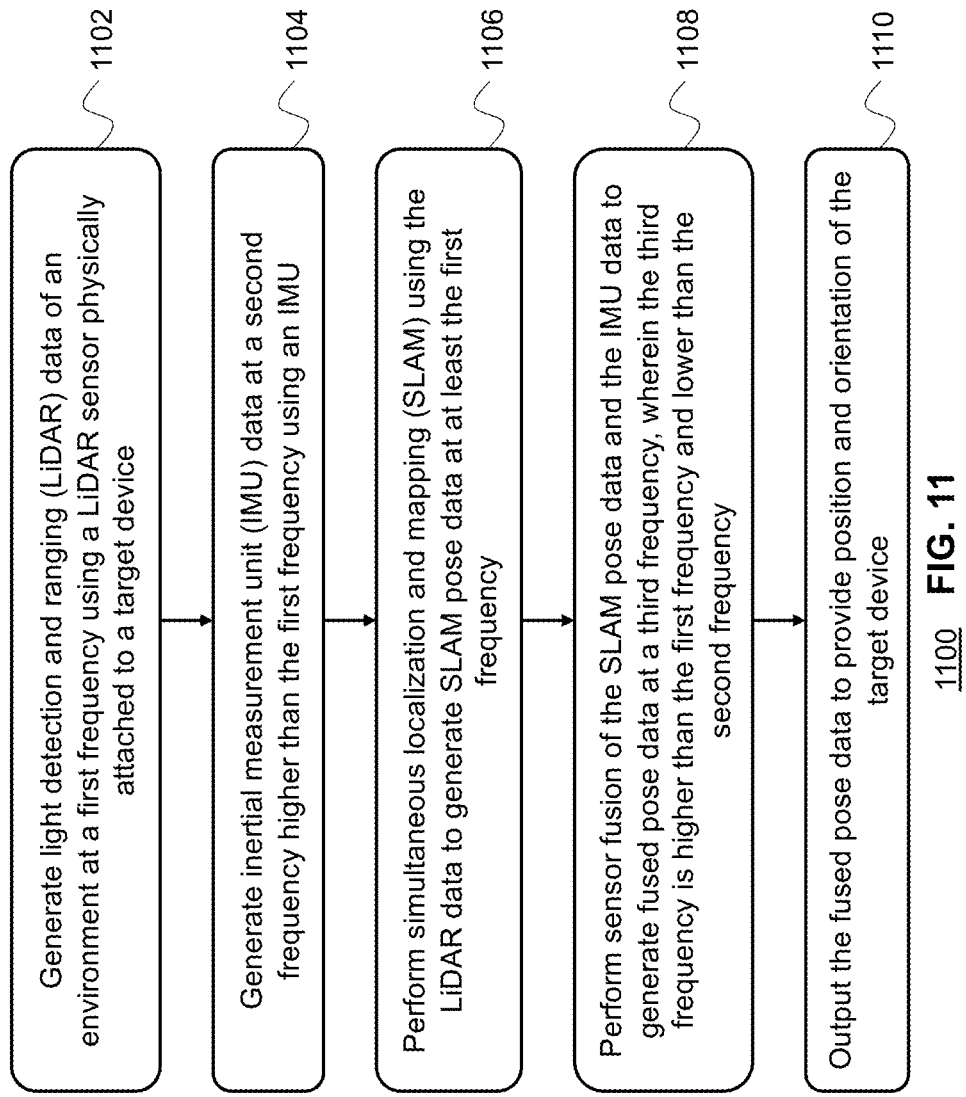
FIG. 11 illustrates a flowchart of a method for tracking a target device in three-dimensional space, according to aspects of the present disclosure.

FIG. 11 illustrates a flowchart of a method 1100 for tracking a target device in three-dimensional space. The method 1100 may be implemented as instructions stored on a non-transitory computer-readable medium and executed by at least one processor configured to perform operations.

The method 1100 begins at step 1102, where LiDAR data of an environment may be generated at a first frequency using a LiDAR sensor physically attached to a target device. In some cases, the target device may be a camera or other imaging equipment. The LiDAR sensor may capture detailed 3D point cloud data of the surrounding environment.

At step 1104, IMU data may be generated at a second frequency that is higher than the first frequency using an IMU. The IMU may provide high-frequency motion data, including acceleration and angular velocity measurements.

The method 1100 proceeds to step 1106, where SLAM may be performed using the LiDAR data to generate SLAM pose data at at least the first frequency. This step may involve processing the LiDAR point cloud data to estimate the position and orientation of the target device within the environment.

At step 1108, sensor fusion of the SLAM pose data and the IMU data may be performed to generate fused pose data at a third frequency. In some cases, the third frequency may be higher than the first frequency and lower than the second frequency. This sensor fusion process may combine the lower-frequency but more accurate SLAM pose estimates with the higher-frequency IMU data to produce smooth and consistent pose estimates.

The method 1100 concludes at step 1110, where the fused pose data may be output to provide position and orientation of the target device. This output may be used for various applications, such as augmented reality rendering or camera motion tracking.

In some cases, the sensors used for tracking may include a Light Detection and Ranging (LiDAR) sensor and an Inertial Measurement Unit (IMU). These sensors may be mounted on a camera head that is part of a cable-based camera system. This configuration may allow for precise tracking of camera movements in large indoor or outdoor spaces, such as sports stadiums.

In other cases, the LiDAR sensor and IMU may be mounted on a drone-based camera system. This arrangement may enable high-precision tracking for aerial cinematography or other applications requiring mobile, airborne camera platforms.

The systems and methods described herein may also be applied in studio environments. In such settings, the LiDAR sensor and IMU may be used to track camera movements with high accuracy, enabling seamless integration of real-world footage with virtual backgrounds and/or AR renderings.

Furthermore, the present systems are designed to handle dynamic environments with moving objects. In settings like sporting events, where players, officials, and spectators are in constant motion, maintaining accurate camera tracking can be difficult. The disclosed techniques account for these dynamic elements, allowing for robust pose estimation even as the scene changes rapidly.

By addressing these key challenges, the systems and methods described herein enable more immersive and stable augmented reality applications in a wide range of environments. The following sections will describe the components and operation of these systems in greater detail.

The system comprises a LIDAR (Light Detection and Ranging) sensor physically attached to a target device. The LiDAR sensor may be configured to generate LiDAR data of an environment at a first frequency. In some cases, the first frequency may be 10 Hz or 20 Hz. The LiDAR sensor may emit laser pulses and measure the time it takes for the pulses to reflect off surfaces in the environment and return to the sensor. This allows the LiDAR sensor to create detailed 3D point cloud representations of the surrounding area.

The LiDAR sensor may be mounted on various types of target devices, such as cameras, drones, or other mobile platforms. The physical attachment ensures that the LIDAR data accurately represents the movement and position of the target device. In some cases, the LiDAR sensor may be integrated into the housing of the target device, while in other cases, it may be attached as an external component.

Suitable LiDAR sensors for this application may include solid-state LiDAR units, which offer compact size and durability, or mechanical scanning LiDAR units that provide a wide field of view. The choice of LiDAR sensor may depend on factors such as the required range, resolution, and power consumption for the specific application.

The system may operate in two distinct modes: a mapped mode and a real-time mode. In the mapped mode, the system may first create a point cloud map of the environment, such as a stadium, before beginning the tracking process. This pre-mapping step may allow for more efficient and accurate localization during subsequent operations. When creating the point cloud map, the system may use larger voxel sizes to reduce noise from dynamic objects, such as people in bleachers. This approach may help create a more stable and reliable map of the static elements in the environment.

In the real-time mode, the system may operate without a pre-existing map. In this mode, the LiDAR sensor may continuously generate data to simultaneously build a map of the environment and localize the target device within that map. This capability may be particularly useful in dynamic or previously unmapped environments.

The LiDAR data generated by the sensor may be subject to distortion due to the motion of the target device during the scanning process. To address this issue, the system may perform LiDAR undistortion using data from an Inertial Measurement Unit (IMU), which may also be physically attached to the target device, as part of the Simultaneous Localization and Mapping (SLAM) processing. This undistortion step may help improve the accuracy of the point cloud data and subsequent pose estimation.

In some cases, the LiDAR sensor may be used in conjunction with other sensors, such as the IMU or camera, to provide complementary data for more robust tracking and localization. The LiDAR data, generated at the first frequency, may be combined with higher-frequency data from the IMU to produce smooth and accurate pose estimates at a third frequency, which may be higher than the first frequency of the LIDAR sensor.

The LiDAR sensor may play a crucial role in enabling accurate tracking and localization, particularly in GPS-denied environments such as indoor spaces or areas with poor satellite visibility. By providing detailed 3D information about the environment, the LiDAR sensor may allow the system to maintain precise positioning even in challenging conditions.

The augmented reality system incorporates an Inertial Measurement Unit (IMU) as a key component for high-frequency motion tracking. An IMU may be an electronic device that measures and reports a body's specific force, angular rate, and sometimes the orientation of the body, using a combination of accelerometers, gyroscopes, and sometimes magnetometers.

In some cases, the IMU may generate data at a second frequency that is higher than the first frequency of the LiDAR sensor. For example, while a typical LiDAR sensor may operate at 10-20 Hz, an IMU may generate data at 100 Hz or higher. This high-frequency data may provide information about the target device's movement between LIDAR scans.

The IMU may be physically attached to or integrated with the target device, such as a camera or other imaging equipment. This integration may allow for precise tracking of the device's motion in six degrees of freedom (6DOF), including translation along three perpendicular axes and rotation around three perpendicular axes.

Various types of IMUs may be used in the system. In some cases, a microelectromechanical systems (MEMS) based IMU may be employed due to its small size, low power consumption, and cost-effectiveness. In other cases, a fiber optic gyroscope (FOG) based IMU may be used for applications requiring higher precision and stability.

The system may use windowed averaging of IMU data to smooth out jitters and reduce noise. This technique may involve taking a moving average of the IMU measurements over a specified time window. By doing so, high-frequency noise and sudden spikes in the data may be attenuated, resulting in smoother motion estimates.

In the method of tracking a target device, the step of generating IMU data at a second frequency higher than the first frequency using an IMU may be used for providing high-frequency updates between LiDAR scans. This high-frequency IMU data may be used to interpolate the device's position and orientation between the lower-frequency LiDAR-based pose estimates.

The IMU data may include measurements of linear acceleration and angular velocity. In some cases, the IMU may also provide orientation data in the form of Euler angles or quaternions. This rich set of motion data may enable the system to track rapid movements and subtle changes in the target device's pose that might occur between LIDAR updates.

By incorporating an IMU that generates data at a higher frequency than the LIDAR sensor, the system may achieve more responsive and accurate tracking of the target device. This high-frequency IMU data may be particularly valuable in dynamic environments or when tracking fast-moving objects, where relying solely on lower-frequency LiDAR data might result in motion blur or tracking lag.

The system may employ a Simultaneous Localization and Mapping (SLAM) module to process LiDAR data and generate SLAM pose data. The SLAM module may utilize various algorithms to simultaneously build a map of the environment and estimate the position of the target device within that map.

In some cases, the SLAM module may implement feature-based SLAM algorithms. These algorithms may identify distinctive features in the LiDAR point cloud data, such as corners, edges, or planar surfaces. The system may track these features across multiple LiDAR scans to estimate the motion of the target device and update the map of the environment.

Alternatively, the SLAM module may use direct methods that operate on raw LIDAR data without extracting specific features. These methods may align consecutive LIDAR scans to estimate the relative motion of the target device and incrementally build a map of the environment.

The SLAM module may generate SLAM pose data at least at the first frequency, which corresponds to the frequency of the LiDAR sensor. For example, if the LiDAR sensor operates at 10 Hz or 20 Hz, the SLAM module may produce pose estimates at the same rate.

In some cases, the system may generate a point cloud map of the environment using previously captured LiDAR data. This pre-generated map may be created during an initial mapping phase, where the target device may be moved through the environment to capture comprehensive LiDAR data. The system may process this data to create a detailed 3D representation of the space.

The point cloud map may be generated before the target device is localized in an environment that contains dynamic objects and/or different weather conditions. This approach may allow the system to create a more stable and reliable map of the static elements in the environment, reducing the impact of temporary or moving objects on the localization process.

Once the point cloud map is generated, the SLAM module may use it to localize the target device within the mapped environment. The module may compare incoming LIDAR data with the pre-generated map to estimate the current position and orientation of the target device. This localization process may occur in real-time as the target device moves through the environment.

In some cases, the system may further comprise a camera as an auxiliary sensor. The camera may be configured to perform visual odometry or visual SLAM to improve tracking. Visual odometry may estimate the motion of the target device by analyzing the changes in camera images over time. Visual SLAM may use camera images to both map the environment and estimate the camera's position.

The integration of visual data with LiDAR-based SLAM may enhance the overall tracking performance of the system. Visual information may provide additional cues for feature matching and loop closure detection, potentially improving the accuracy and robustness of the pose estimates.

The SLAM module may employ various optimization techniques to refine the pose estimates and map structure. These may include graph-based optimization methods that minimize the error between observed measurements and predicted positions based on the current map and trajectory estimates.

In dynamic environments, the SLAM module may implement methods to identify and filter out moving objects from the LiDAR data. This may help maintain accurate localization even in the presence of people, vehicles, or other non-static elements in the scene.

The SLAM module may also incorporate loop closure detection algorithms to recognize when the target device has returned to a previously visited location. This capability may help correct accumulated drift in the pose estimates and improve the overall consistency of the map.

In some cases, the SLAM module may adapt its processing based on the characteristics of the environment. For example, in open outdoor spaces, the module may prioritize long-range features for localization, while in cluttered indoor environments, it may focus on more local geometric structures.

The SLAM pose data generated by the module may include the position and orientation of the target device in three-dimensional space. This data may be represented as a transformation matrix or as separate position and quaternion components, depending on the specific implementation and requirements of the system.

The system may perform sensor fusion to combine Simultaneous Localization and Mapping (SLAM) pose data with Inertial Measurement Unit (IMU) data to generate fused pose data at a third frequency. In some cases, the third frequency may be higher than the first frequency of the SLAM pose data and lower than the second frequency of the IMU data. This fusion process may enable the system to produce high-frequency, smooth pose estimates that accurately track the target device's motion.

In some cases, the sensor fusion may be performed using an extended Kalman filter with a state space model. The state space model may have at least 6 dimensions, and in some cases, up to 21 dimensions. This extended state representation may allow for more accurate modeling of complex motion patterns.

The extended Kalman filter may include a prediction module and an update module. The prediction module may use a physics model to predict the state of the target device between LiDAR updates. In some cases, the physics model may include equations of motion that account for linear, angular, and non-linear motion of the target device, including higher order derivatives of the SLAM pose data.

The physics model may be configured to account for gravitational effects on the motion of the target device. This consideration of gravitational forces may improve the accuracy of state predictions, especially for aerial or suspended target devices.

In some cases, the extended Kalman filter may use a state transition function based on the physics model to propagate the state of the target device forward in time. This propagation may allow the filter to estimate the target device's state between sensor measurements.

The state space model may include position, orientation, linear and angular velocity, linear acceleration, and jerk components of the target device. This comprehensive state representation may enable the system to capture and predict complex motion patterns more accurately.

The extended Kalman filter may use the physics model to predict covariance evolution between measurement updates. This prediction of covariance may help the filter maintain an accurate estimate of uncertainty in the state estimate over time.

In some cases, the extended Kalman filter may adaptively adjust process noise parameters based on known environmental and motion characteristics of the target device. This adaptive adjustment may allow the filter to optimize its performance for different operating conditions.

The sensor fusion process may include a residual calculator that computes the difference between measured values and predicted values generated by the Kalman filter. This residual information may be used to update and refine the state estimate.

In some cases, the system may perform the sensor fusion using a neural network Kalman filter instead of or in addition to the extended Kalman filter. The neural network Kalman filter may comprise a prediction module and an update module, with the prediction module including a neural network system for predicting states of the target device using state input data.

The neural network system may include multiple processing blocks arranged in a cascaded configuration. Each processing block may include a fully connected layer, a backcast network for learning system dynamics, and a forecast network for generating smooth predictions. Outputs from forecast networks of multiple processing blocks may be combined to produce a sum signal representing aggregated processing results.

The Kalman filters may implement a recursive structure, with state estimates being fed back into the prediction module for subsequent iterations of the filter. This recursive approach may allow the filter to continuously refine its predictions based on new measurements and previous estimates.

In some cases, the neural network Kalman filter may be trained to process the SLAM pose data at the first frequency and the IMU data at the second frequency to predict smoothed poses as the fused pose data at the third frequency. The filter may be trained to generate the smoothed poses at a frequency matching or exceeding the rate of the target device.

The neural network Kalman filter may include a covariance predictor that updates covariance information using measurements from a filter update operation. This covariance prediction may help the filter maintain an accurate estimate of uncertainty in its state predictions.

In some cases, the neural network Kalman filter may be configured to adaptively adjust its parameters based on current motion characteristics of the target device and environmental conditions. This adaptive capability may allow the filter to optimize its performance for different operating scenarios.

The neural network Kalman filter may be trained using training data generated from outputs of an extended Kalman filter and smoothing module. The training data may include pairs of input sensor data and corresponding smoothed pose estimates. This training approach may allow the neural network to learn from the performance of traditional filtering techniques while potentially improving upon them.

In some cases, the physics model used in the sensor fusion process may be based on an infrastructure that moves the target device. This infrastructure may include one or more of a crane, a wire setup, a drone, or other device that can carry the LiDAR, the IMU, and the target device as a payload. Tailoring the physics model to the specific infrastructure may improve the accuracy of state predictions.

After the sensor fusion process, the system may smooth the fused pose data to further reduce any remaining jitter or inconsistencies. This smoothing step may help ensure that the final pose estimates are suitable for high-quality augmented reality applications.

By combining these various sensor fusion and frequency boosting techniques, the system may generate high-frequency, accurate, and smooth pose estimates that enable seamless augmented reality experiences across a wide range of environments and applications.

The fused pose data generated by the system may be output to provide accurate position and orientation information for the target device. This high-frequency, smoothed pose data may enable precise tracking of the target device's movements in three-dimensional space.

In some cases, the fused pose data may be transmitted to a graphics rendering system. The graphics rendering system may use the position and orientation information to accurately place virtual objects or overlays in an augmented reality environment. For example, in a sports broadcasting application, the fused pose data may allow virtual field markers, player statistics, or sponsorship logos to be seamlessly integrated with the live video feed.

The position and orientation data derived from the fused pose output may be used to render graphics that appear to be fixed in the real-world environment. As the target device moves, the rendered graphics may update in real-time to maintain their apparent position relative to the physical surroundings. This capability may enable immersive augmented reality experiences where virtual content appears to interact naturally with the real world.

In some cases, the fused pose data may be utilized in live broadcasting scenarios. For instance, in a stadium environment, the system may track the position and orientation of a camera mounted on a cable-suspended rig. The fused pose data may allow for precise alignment of computer-generated graphics with the physical features of the stadium, such as field lines or seating sections.

The output of the fused pose data may also support applications in virtual production environments. In a studio setting with LED walls, the system may track camera movements with high precision. This tracking data may be used to adjust the perspective of virtual backgrounds rendered on the LED walls in real-time, creating a seamless blend of physical and digital elements.

In some cases, the fused pose data may be integrated with other sensor systems or data sources. For example, in a drone-based cinematography application, the pose data may be combined with GPS information and flight control data to enable complex, pre-programmed camera movements while maintaining accurate augmented reality overlays.

The system may output the fused pose data at a frequency that matches or exceeds the frame rate of the target device, such as a camera. This high-frequency output may ensure smooth and responsive updates to rendered graphics or virtual elements, even during rapid movements of the target device.

In some cases, the fused pose data may be used to compensate for lens distortions or other optical effects in the captured imagery. By applying the precise position and orientation information to image processing algorithms, the system may improve the overall visual quality and accuracy of augmented reality content.

The output of fused pose data may also support post-production workflows in film and television. The accurate tracking information may be recorded alongside video footage, allowing visual effects artists to seamlessly integrate computer-generated elements with live-action shots during the editing process.

In some cases, the system may provide interfaces for real-time monitoring and adjustment of the pose estimation process. This capability may allow operators to fine-tune tracking parameters or manually correct any discrepancies in the augmented reality alignment during live broadcasts or performances.

In some cases, the system may process each frame of data within 16.67 milliseconds to maintain a 60 fps output. This rapid processing may ensure that the pose estimates are available in real-time for smooth augmented reality experiences or other time-sensitive applications.

The system may aim for millimeter-level smoothness with respect to the previous frame. This high level of precision may be crucial for maintaining stable and accurate augmented reality overlays, especially in dynamic environments such as sports stadiums.

In some cases, the system may synchronize data coming at different speeds from the LiDAR and IMU. This synchronization process may ensure that the sensor measurements are properly aligned in time, despite the differences in their sampling rates.

The system may optionally take in operator joystick input as a constraint to help make more accurate predictions. This additional input may provide valuable information about intended camera movements, potentially improving the accuracy of the pose estimates.

In some cases, at least some of the operations of the at least one processor may be performed on board the infrastructure or on an external device. The choice of processing location may depend on factors such as available computational resources, power constraints, latency, and the specific requirements of the application.

By integrating these various components and processing steps, the system may achieve high-frequency camera tracking with the accuracy and smoothness required for demanding applications such as broadcast augmented reality.

3. Computer System

Figure 12:
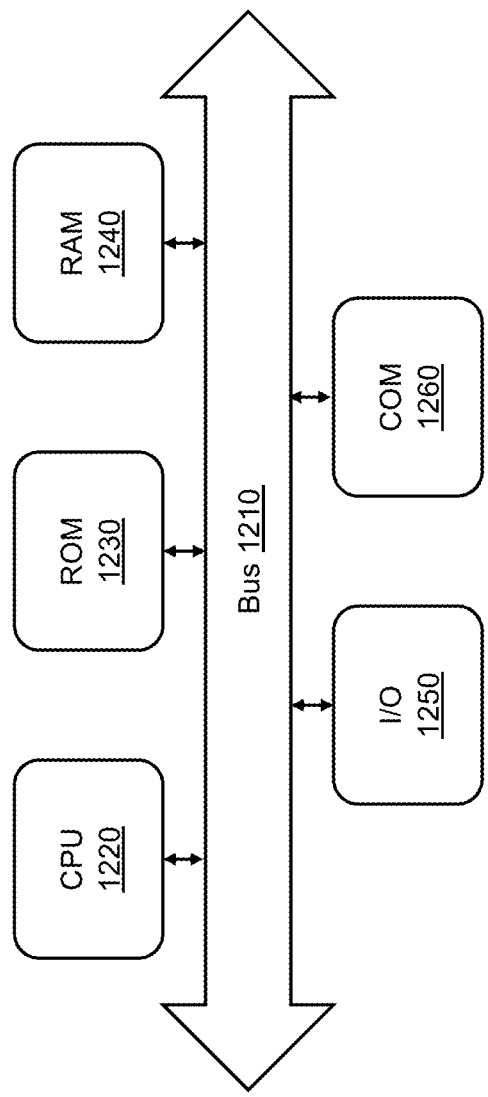
FIG. 12 depicts an example system that may execute techniques presented herein.

FIG. 12 depicts an example system that may execute techniques presented herein. FIG. 12 is a simplified functional block diagram of a computer that may be configured to execute techniques described herein, according to exemplary cases of the present disclosure. Specifically, the computer (or "platform" as it may not be a single physical computer infrastructure) may include a data communication interface 1260 for packet data communication. The platform may also include a central processing unit ("CPU") 1220, in the form of one or more processors, for executing program instructions. The platform may include an internal communication bus 1210, and the platform may also include a program storage and/or a data storage for various data files to be processed and/or communicated by the platform such as ROM 1230 and RAM 1240, although the system 1200 may receive programming and data via network communications. The system 1200 also may include input and output ports 1250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

4. Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

As used herein, the terms "transmit," "provide," "receive," and "obtain" may refer to the transfer or communication of data, information, or signals between various components or entities. This may include, but is not limited to, transmission over a network (such as a local area network, wide area network, or the Internet), transfer between devices (such as between computers, smartphones, or other electronic devices), communication between central processing units (CPUs) or graphics processing units (GPUs), exchange of information between microservices, transfer of data between software components within an environment, or any other form of data transfer or communication as indicated by the context in which the terms are used. The specific mode or medium of transmission or provision may vary depending on the particular implementation and system architecture.

As used herein, the term "module" may refer to software code, a software component, a software function, a software application, and firmware. As indicated by context, "module" may be logical, digital, analog, optical, electronic, or quantum implementations of operations or functions. A module may be implemented as a standalone unit or as part of a larger system. In some cases, a module may interact with other modules or components to perform specific tasks or operations within the system. As indicated by context or based on design preference, any two modules may be combined. As indicated by context or based on design preference, any module may be broken into two or more modules that provide some or all of the operations or functions of the single module. The specific implementation of module(s) may vary depending on the requirements of the system and the particular application.

The term "exemplary" is used in the sense of "example" rather than "ideal." As used herein, the singular forms "a," "an," and "the" include plural reference unless the context dictates otherwise.

5. Examples

Exemplary embodiments of the systems and methods disclosed herein are described in the numbered paragraphs below.

- A1. A system for tracking a target device in three-dimensional space, the system comprising: a light detection and ranging (LiDAR) sensor physically attached to a target device and configured to generate LiDAR data of an environment at a first frequency; an inertial measurement unit (IMU) configured to generate IMU data at a second frequency higher than the first frequency; and at least one processor configured to perform operations, wherein the operations include: perform simultaneous localization and mapping (SLAM) using the LiDAR data to generate SLAM pose data at at least the first frequency; perform sensor fusion of the SLAM pose data and the IMU data to generate fused pose data at a third frequency, wherein the third frequency is higher than the first frequency and lower than the second frequency; and output the fused pose data to provide position and orientation of the target device.
- A2. The system of A1, wherein the first frequency is either 10 Hz or 20 Hz, the second frequency is at least 100 Hz, and the third frequency is 60 Hz.
- A3. The system of any of A1-A2, wherein the operations further include smooth the fused pose data.
- A4. The system of any of A1-A3, wherein the operations further include generate a point cloud map of the environment using previously captured LiDAR data, and localize the target device within the point cloud map, and wherein the point cloud map is generated before the target device is localized in an environment that contains dynamic objects and/or different weather conditions.
- A5. The system of any of A1-A4, wherein the operations further include perform the sensor fusion using an extended Kalman filter with a state space model having at least 6 dimensions, and up to 21 dimensions.
- A6. The system of A5, wherein the extended Kalman filter includes a prediction module and an update module, and the prediction module uses a physics model to predict a state of the target device between LiDAR updates.
- A7. The system of A6, wherein the physics model includes equations of motion that account for linear, angular, and non-linear motion of the target device including higher order derivatives of the SLAM pose data.
- A8. The system of A6, wherein the extended Kalman filter uses a state transition function based on the physics model to propagate the state of the target device forward in time.
- A9. The system of A6, wherein the physics model is configured to account for gravitational effects on motion of the target device.
- A10. The system of A6, wherein the extended Kalman filter uses the physics model to predict covariance evolution between measurement updates.
- A11. The system of A6, wherein the physics model includes non-linear motion equations to more accurately represent complex movements of the target device.
- A12. The system of A6, wherein the physics model is be based on an infrastructure that moves the target device, and the infrastructure includes one or more of a crane, a wire setup, a drone, or other device that can carry the LiDAR, the IMU, and the target device as a payload.
- A13. The system of A12, wherein at least some of the operations of the at least one processor are performed on board the infrastructure or on an external device.
- A14. The system of A5, wherein the state space model includes position, orientation, linear and angular velocity, linear acceleration and jerk components of the target device.
- A15. The system of A5, wherein the extended Kalman filter adaptively adjusts process noise parameters based on known environmental and motion characteristics of the target device.
- A16. The system of A5, further comprising a camera, wherein the camera is an auxiliary sensor and configured to perform visual odometry or SLAM to improve tracking.
- A17. The system of A1, wherein the operations further include perform the sensor fusion using a neural network Kalman filter.
- A18. The system of A17, wherein the neural network Kalman filter comprises a prediction module and an update module, and the prediction module includes a neural network system for predicting states of the target device using state input data.
- A19. The system of A18, wherein the neural network system includes multiple processing blocks arranged in a cascaded configuration.
- A20. The system of A19, wherein each processing block of the neural network system includes a backcast network for learning system dynamics and a forecast network for generating smooth predictions.
- A21. The system of A20, wherein outputs from forecast networks of multiple processing blocks are combined to produce a sum signal representing aggregated processing results.
- A22. The system of A18, wherein the neural network Kalman filter implements a recursive structure, with state estimates being fed back into the prediction module for subsequent iterations of the neural network Kalman filter.

A23. The system of A17, wherein the neural network Kalman filter is trained to process the SLAM pose data at the first frequency and the IMU data at the second frequency to predict smoothed poses as the fused pose data at the third frequency.

A24. The system of A23, wherein the neural network Kalman filter is trained to generate the smoothed poses at a frequency matching or exceeding a rate of the target device.

A25. The system of A17, wherein the neural network Kalman filter includes a covariance predictor that updates covariance information using measurements from a filter update operation of the neural network Kalman filter.

A26. The system of A17, wherein the neural network Kalman filter is configured to adaptively adjust its parameters based on current motion characteristics of the target device and environmental conditions.

A27. The system of A17, wherein the neural network Kalman filter is trained using training data generated from outputs of an extended Kalman filter and smoothing module, the training data includes pairs of input sensor data and corresponding smoothed pose estimates.

A28. The system of any of A1-A27, wherein the operations further include perform the sensor fusion using a residual calculator that computes a difference between measured values and predicted values generated by a Kalman filter.

A29. The system of any of A1-A28, wherein the position and the orientation of the target device is used to render graphics based on the position and the orientation of the target device.

A30. The system of any of A1-A29, wherein the target device is a camera.

A31. A method for tracking a target device in three-dimensional space, the method comprising: generating light detection and ranging (LiDAR) data of an environment at a first frequency using a LiDAR sensor physically attached to a target device; generating inertial measurement unit (IMU) data at a second frequency higher than the first frequency using an IMU; performing simultaneous localization and mapping (SLAM) using the LiDAR data to generate SLAM pose data at at least the first frequency; performing sensor fusion of the SLAM pose data and the IMU data to generate fused pose data at a third frequency, wherein the third frequency is higher than the first frequency and lower than the second frequency; and outputting the fused pose data to provide position and orientation of the target device.

A32. A non-transitory computer-readable medium storing instructions that, when executed by at least one processor, cause the at least one processor to perform operations for tracking a target device in three-dimensional space, the operations comprising: receiving light detection and ranging (LiDAR) data of an environment at a first frequency from a LIDAR sensor physically attached to a target device; receiving inertial measurement unit (IMU) data at a second frequency higher than the first frequency from an IMU; performing simultaneous localization and mapping (SLAM) using the LiDAR data to generate SLAM pose data at at least the first frequency; performing sensor fusion of the SLAM pose data and the IMU data to generate fused pose data at a third frequency, wherein the third frequency is higher than the first frequency and lower than the second frequency; and outputting the fused pose data to provide position and orientation of the target device.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for tracking a target device in three-dimensional space, the system comprising:
   a target device configured to obtain sensor data at a target frequency;
   a light detection and ranging (LiDAR) sensor physically attached to the target device and configured to generate LiDAR data of an environment at a first frequency;
   an inertial measurement unit (IMU) configured to generate IMU data at a second frequency higher than the first frequency; and
   at least one processor configured to perform operations, wherein the operations include:
   perform simultaneous localization and mapping (SLAM) using the LiDAR data and the IMU data to generate SLAM pose data at at least the first frequency;
   perform sensor fusion of the SLAM pose data and the IMU data to generate fused pose data at a third frequency, wherein the third frequency is higher than the first frequency and lower than the second frequency, and the third frequency is configured to match or exceed the target frequency; and
   output the fused pose data and the sensor data to provide position and orientation of the target device with the sensor data.

2. The system of claim 1, wherein the first frequency is either 10 Hz or 20 Hz, the second frequency is at least 100 Hz, and the third frequency is 60 Hz.

3. The system of claim 1, wherein the operations further include smoothing the fused pose data to obtain smoothed data, and the smoothed data produces a sub-centimeter relative accuracy.

4. The system of claim 1, wherein the operations further include generate a point cloud map of the environment using previously captured LiDAR data, and localize the target device within the point cloud map, and wherein the point cloud map is generated before the target device is localized in an environment that contains dynamic objects and/or different weather conditions.

5. The system of claim 1, wherein the operations further include perform the sensor fusion using an extended Kalman filter with a state space model having at least 6 dimensions, and up to 21 dimensions.

6. The system of claim 5, wherein the extended Kalman filter includes a prediction module and an update module, and the prediction module uses a physics model to predict a state of the target device between LiDAR updates.

7. The system of claim 6, wherein the physics model includes equations of motion that account for linear, angular, and non-linear motion of the target device including higher order derivatives of the SLAM pose data.

8. The system of claim 6, wherein the physics model is be based on an infrastructure that moves the target device, and the infrastructure includes one or more of a crane, a wire setup, or an aerial vehicle.

9. The system of claim 8, wherein at least some of the operations of the at least one processor are performed on board the infrastructure or on an external device.

10. The system of claim 5, further comprising a camera, wherein the camera is an auxiliary sensor and configured to perform visual odometry or SLAM to improve tracking.

11. The system of claim 1, wherein the operations further include perform the sensor fusion using an extended Kalman filter, and the extended Kalman filter adaptively adjusts process noise parameters based on known environmental and motion characteristics of the target device.

12. The system of claim 1, wherein the operations further include perform the sensor fusion using a neural network Kalman filter.

13. The system of claim 12, wherein the neural network Kalman filter comprises a prediction module and an update module, and the prediction module includes a neural network system for predicting states of the target device using state input data.

14. The system of claim 13, wherein the neural network system includes multiple processing blocks arranged in a cascaded configuration.

15. The system of claim 14, wherein each processing block of the neural network system includes a backcast network for learning system dynamics and a forecast network for generating smooth predictions such that the smooth predictions produce a sub-centimeter relative accuracy.

16. The system of claim 12, wherein the neural network Kalman filter is trained using training data generated from outputs of an extended Kalman filter module, the training data includes pairs of input sensor data and corresponding smoothed pose estimates which produce a sub-centimeter relative accuracy.

17. The system of claim 1, wherein the position and the orientation of the target device is used to render graphics based on the position and the orientation of the target device.

18. The system of claim 1, wherein the target device is a camera.

19. A method for tracking a target device in three-dimensional space, the method comprising:
   configuring a target device to obtain sensor data at a target frequency;
   generating light detection and ranging (LiDAR) data of an environment at a first frequency using a LiDAR sensor physically attached to the target device;
   generating inertial measurement unit (IMU) data at a second frequency higher than the first frequency using an IMU;
   performing simultaneous localization and mapping (SLAM) using the LiDAR data and the IMU data to generate SLAM pose data at at least the first frequency;
   performing sensor fusion of the SLAM pose data and the IMU data to generate fused pose data at a third frequency, wherein the third frequency is higher than the first frequency and lower than the second frequency, and the third frequency is configured to match or exceed the target frequency of the target device; and
   outputting the fused pose data and the sensor data to provide position and orientation of the target device with the sensor data.

20. A non-transitory computer-readable medium storing instructions that, when executed by at least one processor, cause the at least one processor to perform operations for tracking a target device in three-dimensional space, the operations comprising:
   configuring a target device to obtain sensor data at a target frequency;
   receiving light detection and ranging (LiDAR) data of an environment at a first frequency from a LiDAR sensor physically attached to a target device;
   receiving inertial measurement unit (IMU) data at a second frequency higher than the first frequency from an IMU;
   performing simultaneous localization and mapping (SLAM) using the LiDAR data and the IMU data to generate SLAM pose data at at least the first frequency;
   performing sensor fusion of the SLAM pose data and the IMU data to generate fused pose data at a third frequency, wherein the third frequency is higher than the first frequency and lower than the second frequency, and the third frequency is configured to match or exceed the target frequency of the target device; and
   outputting the fused pose data and the sensor data to provide position and orientation of the target device with the sensor data.

* * * * *